United States Patent
Matsumoto et al.

(10) Patent No.: US 7,393,804 B2
(45) Date of Patent: Jul. 1, 2008

(54) EXHAUST GAS PURIFYING CATALYST AND PROCESS FOR PURIFICATION OF EXHAUST GAS

(75) Inventors: Takeshi Matsumoto, Utsunomiya (JP); Takao Kobayashi, Yokohama (JP); Takuji Nakane, Himeji (JP); Takahiro Uno, Paducah, KY (US); Makoto Horiuchi, Himeji (JP)

(73) Assignees: ICT Co., Ltd., Osaka (JP); International Catalyst Technology Inc., Auburn Hills, MI (US)

( * ) Notice: Subject to any disclaimer, the term of this patent is extended or adjusted under 35 U.S.C. 154(b) by 188 days.

(21) Appl. No.: 10/535,331

(22) PCT Filed: Nov. 18, 2003

(86) PCT No.: PCT/JP03/14650

§ 371 (c)(1),
(2), (4) Date: May 18, 2005

(87) PCT Pub. No.: WO2004/045766

PCT Pub. Date: Jun. 3, 2004

(65) Prior Publication Data

US 2006/0014630 A1    Jan. 19, 2006

(30) Foreign Application Priority Data

Nov. 18, 2002    (JP) .............................. 2002-333629

(51) Int. Cl.
*B01J 29/06* (2006.01)
*B01D 53/56* (2006.01)

(52) U.S. Cl. .............................. 502/60; 502/63; 502/64; 502/67; 502/71; 502/77; 423/239.1; 423/239.2; 423/213.2; 423/213.5; 423/219; 423/245.3

(58) Field of Classification Search .................. 502/60, 502/63, 64, 67, 69, 71, 77; 423/213.2, 213.5, 423/219, 239.2, 245.3
See application file for complete search history.

(56) References Cited

U.S. PATENT DOCUMENTS 6,489,259 B2 * 12/2002 LaBarge et al. ............... 502/64
2002/0086793 A1    7/2002 Labarge et al.

FOREIGN PATENT DOCUMENTS

| JP | 60-125250 | 7/1985 |
|---|---|---|
| JP | 2-139040 | 5/1990 |
| JP | 05-220403 | 8/1993 |
| JP | 07-008754 | 1/1995 |
| JP | 07-144134 | 6/1995 |
| JP | 07-289910 | 11/1995 |
| JP | 08-173761 | 7/1996 |
| JP | 11-300211 | 11/1999 |

* cited by examiner

*Primary Examiner*—Elizabeth D Wood
(74) *Attorney, Agent, or Firm*—Occhiuti Rohlicek & Tsao LLP

(57) ABSTRACT

An exhaust gas purifying catalyst has a catalytic component including copper, ZSM-5, and β zeolite. This exhaust gas purifying catalyst reduces nitrogen oxides even from low temperature range and exhibits durability even under a thermal load of high temperature.

19 Claims, No Drawings

EXHAUST GAS PURIFYING CATALYST AND PROCESS FOR PURIFICATION OF EXHAUST GAS

CROSS-REFERENCE TO RELATED APPLICATIONS

This application is the National Stage of International Application No. PCT/JP2003/014650, filed Nov. 18, 2003, which claims the benefit of Japanese Patent Application Serial No. 2002-333629, filed on Nov. 18, 2002. The contents of both applications are hereby incorporated by reference in their entireties.

TECHNICAL FIELD

This invention relates to a catalyst for purifying exhaust gases in particular from an internal combustion engine, and a process for purifying the exhaust gases using the same.

BACKGROUND ART

Generally a catalyst for purifying exhaust gases from an internal combustion engine comprises a catalyst in which noble metal components, such as Pt, Pd, and Rh, are deposited on an activated alumina. This catalyst is capable of simultaneously removing hydrocarbon (HC), carbon monoxide (CO) and nitrogen oxides (NOx) and, therefore, has been designated as "three way catalyst".

This catalyst serves effectively under conditions nearby the theoretical air fuel ratio (A/F), but, has a problem that NOx removal is not sufficient under lean conditions such as an oxygen-rich exhaust gas from a diesel engine.

An attempt for removing NOx under such lean conditions has been proposed which adds a reducing agent, such as ammonia, into the exhaust gases. The use of this process in an automobile, namely a mobile source of noxious exhaust gas, however, has been of no practical use.

Alternatively, a NOx decomposition catalyst has been proposed in which copper is ion-exchanged with zeolite to form a Cu-deposited zeolite catalyst (JP-A-60-125250). This catalyst, however, has a problem that the NOx conversion thereof is low after a high temperature durability test for example at 600° C.

Then, for solving the durability problem a catalyst having copper deposited on β type zeolite has been proposed (JP-A-5-220403). This catalyst, however, has problems that the NOx purification thereof is low at high temperatures (more than 450° C.) and a temperature window range thereof during purification become narrow.

DISCLOSURE OF INVENTION

An object of the present invention is to provide a catalyst which purifies an exhaust gas from an internal combustion engine, such as a diesel engine, reduces NOx even from a low temperature of exhaust gas, effects comparatively high repression of degradation even under the thermal load of high temperature as well, and enjoys improvement as compared with the conventional catalyst, and a process for purifying exhaust gases using the catalyst.

We have pursued a diligent study on the above problems and, as a result, have found that the use of the catalyst components of copper, zeolite and β type zeolite results in an improved catalyst which is capable of removing NOx at low temperatures, of widening the window range for NOx purification and of being resistant to high temperature and durability. We have further found that the addition of other catalytic component, such as phosphorus, results in improving the properties thereof to a greater degree.

To be specific, the catalyst for purifying exhaust gases of this invention contains a catalytic component such as copper (existing mainly as an oxide as the catalyst), ZSM-5 and β type zeolite.

This invention relates as well to a process for purifying exhaust gases from a diesel engine using the catalyst.

In accordance with the catalyst of the present invention, it can reduce NOx even at low temperatures and be resistant to high temperatures and durability.

Further, in accordance with the present process, it can purify exhaust gases from diesel engines.

BEST MODE FOR CARRYING OUT THE INVENTION

Now, this invention will be described in detail below.

The catalyst of this invention is characterized by two kinds of zeolites, i.e., ZSM-5 and β type zeolite. Namely, the ZSM-5 is preferred to have a $SiO_2:Al_2O_3$ molar ratio of 20-100:1 and average crystal diameters (crystal sizes) not exceeding 0.5 μm (exclusive of zero) observed under an electron microscope. The β type zeolite is preferred to have a $SiO_2/Al_2O_3$ molar ratio of 10-50:1. Thus, this invention is enabled to provide a catalyst which excels in the ability to reduce NOx even when the treating temperature is low for instance 350° C. or more and in the durability as well. Further, the ZSM-5 and the β type zeolite are preferably mixed at a weight ratio of 1:0.1-1:5, for more heightening the activity of the catalyst.

The copper is preferably -deposited on both of the ZSM-5 and the β type zeolite. The expression "copper is deposited on zeolite" as used herein means that the copper is deposited on the zeolite by means of ion exchange and that the copper is caused to adhere to the zeolite in the form of oxide. By depositing the copper on the zeolite directly, it is possible to heighten the activity of the produced catalyst to a greater degree than when the copper is dispersed and then deposited thereon.

Though the catalytic component including the copper, ZSM-5, and β type zeolite may be molded into a catalyst, the use thereof, in which the catalytic component is coated on a refractory three-dimensional structure, proves preferable in view of reducing pressure loss during the purification of the exhaust gases from internal combustion engines. Examples of the refractory three-dimensional structure may include known substrates such as "ceramic honeycomb substrate". Particularly, examples of those honeycomb substrates may include those made of materials such as cordierite, mullite, α-alumina, zirconia, titania, titanium phosphate, aluminum titanate, aluminosilicate, and magnesium silicate. Among them, cordierite proves especially favorable. Besides, integral structures made of antioxidant refractory metals, such as stainless steel and Fe—Cr—Al alloy, may be cited.

The catalyst contains copper in the form of oxide preferably in an amount of 3-30 g and more preferably of 3-10 g, and the zeolite (the total of ZSM-5 and β type zeolite) preferably in an amount of 70-300 g and more preferably in the range of 70-200 g, per liter of the structure. If the amount of the copper falls short of 3 g, the shortage will be at a disadvantage in degrading the ability to purify NOx because of insufficient amount of the copper. Conversely, if this amount exceeds 30 g, the excess will bring about adverse effects that excessive copper oxide on the surface of the carried zeolite promotes the oxidation reaction, and adversely lowers the NOx purification ability.

Further, the catalyst may include at least one element selected from the group consisting of phosphorus, cerium, and boron (hereinafter referred to as "other catalytic component") from the standpoint of improving durability. The phosphorus is preferably contained in the range of 0.1-0.6 part by weight, more preferably in the range of 0.2-0.4 part by weight as reduced to oxide, the cerium preferably in an amount of 0.5-3 parts by weight, more preferably of 1.0-2.0 parts by weight as reduced to oxide, the boron preferably in an amount of 0.1-2.0 parts by weight, more preferably of 0.1-1.0 part by weight as reduced oxide, and at least two elements selected from phosphorus, cerium and boron preferably in an amount of 0.1-3 parts by weight, more preferably of 0.1-2.0 parts by weight as reduced to oxide, relative to 1 part by weight of the copper oxide, respectively. By defining the amounts to be added, the effect of the addition of the other catalytic components can be improved.

The catalyst of this invention can be prepared by the following process.

First, copper is allowed to deposit on zeolite by means of a known process, such as immersion and impregnation. Examples of copper may include soluble salts, such as copper acetate, copper nitrate, and copper sulfate. A prescribed amount of copper acetate is dissolved in water and then to the resultant aqueous solution are added and mixed thoroughly prescribed amounts of ZSM-5 and β zeolite. Subsequently, the resultant mixture is dried for example at 100°-150° C. for 10-20 hours. It is further calcined in air, for example, at 400°-800° C. for 1-3 hours. The resultant copper-carried zeolite is used at the next step as it is or, when necessary, after pulverization.

Then, the calcined powder thus obtained is poured into an aqueous solution containing a binder, such as silica sol, and wet pulverized using a ball mill to form a slurry. The amount of the binder may be required, but not particularly restricted, to be sufficient for inducing satisfactory adhesion of the catalytic component, namely calcined powder, to the substrate, e.g., in the range of 10-40 parts by weight, as solids based on 100 parts by weight of the zeolite. If this amount falls short of 10 parts by weight, the shortage will induce the separation of the catalyst component from the structure after deposition. On the other hand, if the amount exceeds 40 parts by weight, the excess will induce the reduction of the NOx purification ability, since the proportions of the copper and zeolite in the coating layer are reduced.

Further, the slurry so obtained is coated on a honeycomb substrate by a known process, such as immersion. The coated honeycomb is dried for instance at 100°-150° C. for 10 minutes-one hour, and, when necessary, further calcined in air for example at 400°-800° C. for 1-3 hours.

The other catalytic component may be introduced into the aqueous solution containing the copper, and simultaneously deposited on the structure. The other catalytic component is preferred to be a soluble salt in view of being deposited in a dispersed state. Examples of the soluble salt of phosphorus may include orthophosphoric acid and ammonium dihydrogen phosphate. Examples of the soluble salt of cerium may include cerium acetate, cerium nitrate, and cerium sulfate. Examples of the soluble salt of boron may include ammonium borate, magnesium borate, cerium borate, and boric acid.

The catalyst thus obtained is useful for purifying exhaust gases, in particular oxygen-rich exhaust gases. The expression "oxygen-rich" as used herein means that the atmosphere contains excess oxygen necessary for perfectly oxidizing combustible substances, such as CO and HC, contained in the exhaust gas into water and carbon dioxide. It is particularly useful for purifying exhaust gases containing NOx from diesel engines. It can manifest the NOx purification ability even when the A/F ratio is not less than 20. The catalyst is preferably mounted in the exhaust gas pipe under the floor. When the exhaust gas contains a reducing agent, such as HC, insufficiently, it should add a source of HC like light oil, which is the fuel for a diesel engine. The light oil can be added into the exhaust gas at the upstream side of the catalyst by means of a known process, such as adding dropwise or spraying the light oil into the exhaust gas. In this case, the molar ratio of the HC and NOx (HC reduced as $C_1$:NOx) in the exhaust gas is generally in the range of 0.5-30:1 and preferably in the range of 1-20:1 for thoroughly reducing NOx and preventing the added light oil from being discharged as unaltered harmful components.

EXAMPLES

Now, this invention will be described specifically below with reference to examples. This invention is not limited to examples.

(Process for Testing Ability to Purify Exhaust Gas)

A turbulence chamber type diesel engine (4 cylinders, 3100 cc), and a light oil having a sulfur content of 0.05% by weight as the fuel are used.

First, an exhaust gas purifying catalyst is set in an exhaust gas pipe connected to the diesel engine. The engine is set rotating at 2200 rpm under pre-load. The exhaust gas is kept flowing through the catalyst for 1 hour under the conditions that the temperature at the upstream side terminal part of the catalyst (hereinafter referred to as "catalyst inlet temperature") is kept at 500° C. and the space velocity 61,000 $Hr^{-1}$.

After the catalyst inlet temperature has been fully stabilized at 500° C., the exhaust gas was analyzed for concentrations (mol) of NOx, HC, CO, and $SO_2$ on a continuous gas analyzer. Specifically, the concentration of NOx was measured on a chemical emission analyzer (CLD), that of HC on a hydrogen flame ion chemical analyzer (FID), that of CO on a non-dispersion type infrared analyzer (NIDR), and that of $SO_2$ on a flame photometric detector (FPD). As a result, the composition of the exhaust gas prior to the addition of the light oil was found to contain 320 ppm of NOx, 60 ppm of HC, 180 ppm of HC, and 15 ppm of $SO_2$. The light oil as the reducing agent for NOx was poured at a rate of 8.5 mL/min. into the exhaust gas pipe at the upstream side of the catalyst.

The purification ratios (degrees of conversion) of the relevant component, namely the NOx purification ratio and the $SO_2$ conversion degree, are determined based on the contents of the component prior to the addition of the light oil and the contents thereof after the contact with the catalyst after the addition of the light oil.

Further, the purification ratios of the relevant component are determined by similarly measuring the contents of NOx at varying catalyst inlet temperatures of 450° C., 400° C., and 350° C. Exhaust gas compositions before adding the light oil and amounts of the added light oil at varying temperatures are shown in Table 1. The NOx purification ratios at varying temperatures are shown in Table 3. Activity evaluations after durability were performed as follows: After an activity evaluation at the initial stage had been finished, the engine was set revolving at 2600 rpm and regarding torque, the exhaust gas flowed for 15 hours at the catalyst inlet temperature of 620° C., and then the activity evaluation performed in the manner similar to that of the initial stage. The NOx purification ratios after the durability test are shown in Table 4.

Example 1

In an aqueous solution containing 33.8 g of copper nitrate, were placed and thoroughly mixed 118.8 g of ZSM-5 (BET surface area: 350 m$^2$/g, SiO$_2$/Al$_2$O$_3$ molar ratio: 30, and average crystal diameter: 0.4 μm), and 45.3 g of β type zeolite (BET surface area: 680 m$^2$/g, and SiO$_2$/Al$_2$O$_3$ molar ratio of 25). The resultant mixture was dried at 120° C. overnight and further calcined at 500° C. for one hour to obtain a copper/zeolite powder, in which the copper was dispersed and deposited on the zeolite.

Then, the powder so obtained was placed in an aqueous solution containing 196.4 g of silica sol (available from Nissan Kagaku K.K. as "Snowtex N", SiO$_2$: 20 wt %), thoroughly mixed, and wet milled in a ball mill for 14 hours.

In the slurry consequently obtained, was immersed an open flow type honeycomb substrate made of cordierite. Here, the honeycomb substrate had a shape of cylinder measuring 53 mm in diameter and 126 mm in length, and furnished with about 400 gas passing cells per square inch of the cross section.

Subsequently, the honeycomb substrate immersed in the slurry was air-blown to remove excess slurry, dried by horizontally blowing, and then calcined at 500° C. for one hour to obtain an exhaust gas purifying catalyst.

The produced catalyst was found to have 10 wt. parts of the ZSM-5 and 3.6 wt. parts of the β type zeolite, based on 1 wt. part of the copper oxide. The total content of zeolite was found to be 95 g per liter of the structure. The amounts thus deposited are shown in Table 2 below.

The catalyst so obtained was tested in the engine for the performance of exhaust gas purification by the process described above. Specifically, the NOx purification ratios were measured at different catalyst inlet temperatures of 500° C., 450° C., 400° C., and 350° C. The results are shown in Tables 3 and 4 below.

Example 2

The procedure of Example 1 was repeated to form a slurry, except that 118.8 g of the ZSM-5, 45.3 g of the β type zeolite, 33.8 g of copper nitrate, and 196.4 g of silica sol (see Example 1) were used. A two-stage coating was performed to give a catalyst.

The produced catalyst included 10 wt. parts of the ZSM-5 and 3.6 wt. parts of the β type zeolite, per 1 wt. part of the copper oxide. The total content of zeolite was found to be 190 g per liter of the structure.

Example 3

The procedure of Example 1 was repeated to form a slurry, except that 114.8 g of the ZSM-5, 43.7 g of the β type zeolite, 53.7 g of copper nitrate, and 189.6 g of the silica sol were used. A two-stage coating was performed to give a catalyst.

The produced catalyst included 6.1 wt. parts of the ZSM-5 and 2.2 wt. parts of the β type zeolite, per 1 wt. part of the copper oxide. The total content of zeolite was found to be 190 g per liter of the structure.

Example 4

The procedure of Example 1 was repeated to form a slurry, except that a ZSM-5 (BET surface area: 350 m$^2$/g, SiO$_2$/Al$_2$O$_3$ molar ratio: 70, and average crystal diameter: less than 0.05 μm) was used instead of the ZSM-5.

The produced catalyst included 10 wt. parts of the ZSM-5 and 3.6 wt. parts of the β type zeolite, per 1 wt. part of the copper oxide. The total content of zeolite was found to be 95 g per liter of the structure.

Example 5

The ZSM-5 (118.0 g, see Example 4), and 45.0 g of the β type zeolite were poured in an aqueous solution containing 33.6 g of copper nitrate and 2.3 g of ammonium dihydrogen phosphate, and the resultant solution thoroughly mixed. In accordance with the procedure of Example 1, a copper/zeolite powder, in which the catalyst components are dispersed and deposited on the zeolite, was obtained.

The powder thus obtained was placed in an aqueous solution containing 195.0 g of silica sol (see Example 1) and 2.3 g of ammonium dihydrogen phosphate, thoroughly mixed, and wet milled in a ball mill for 14 hours.

The produced catalyst included 10 wt. parts of the ZSM-5, 3.6 wt. parts of the β zeolite, and 0.13 wt. part of phosphorus, per 1 wt. part by weight of the copper oxide. The total content of zeolite was found to be 95 g per liter of the structure.

Example 6

The ZSM-5 (118.8 g, see Example 4), and 45.3 g of the β type zeolite were poured into an aqueous solution containing 33.8 g of copper nitrate and 20.0 g of cerium nitrate (III) six hydrates, and the resultant solution thoroughly mixed. In accordance with the procedure of Example 1, a copper/zeolite powder, in which the catalyst components are dispersed and deposited on the zeolite, was obtained.

The powder thus obtained was placed in an aqueous solution containing 115.2 g of silica sol (see Example 1), thoroughly mixed, and wet milled in a ball mill for 14 hours.

The produced catalyst included 10 wt. parts of the ZSM-5, 3.6 wt. parts of the β zeolite, and 1.4 wt. parts of cerium, per 1 wt. part of the copper oxide. The total content of zeolite was found to be 95 g per liter of the structure.

Example 7

The procedure of Example 1 was repeated, except that 120.7 g of the ZSM-5 (see Example 4), 45.3 g of the β type zeolite, 33.8 g of copper nitrate, and 4.4 g of ammonium borate were used to prepare a copper/(zeolite+boron) powder in which the catalyst component was dispersed and deposited thereon.

The copper/(zeolite+boron) powder thus obtained was placed in an aqueous solution containing 115.2 g of silica sol (see Example 1), thoroughly mixed, and wet milled in a ball mill for 14 hours.

The produced catalyst included 10 wt. parts of the ZSM-5, 3.6 wt. parts of the β zeolite, and 0.13 wt. part of boron, per 1 wt. part of the copper oxide. The total zeolite content was 95 g per liter of the structure.

Comparative Example 1

The ZSM5 (SiO$_2$/Al$_2$O$_3$ molar ratio: 70) was immersed in an aqueous copper acetate solution (the pH was adjusted to 11 by adding ammonia), thoroughly mixed, dried at 120° C. for overnight, and calcined at 500° C. for one hour to obtain a copper/ZSM5 powder. The powder thus obtained (150 g) was poured in an aqueous solution containing 184 g of silica sol (see Example 1), thoroughly mixed, and wet milled in a ball mill for 14 hours.

The slurry thus obtained was deposited on the structure similar to Example 1 to produce a catalyst. The catalyst thus obtained included 7 g of copper oxide, 95 g of the ZSM5, per 1 liter of the structure.

Comparative Example 2

The procedure of Comparative Example 1 was repeated, except that β type zeolite ($SiO_2/Sl_2O_3$ molar ratio: 25) was used instead of the ZSM5.

The amounts of the deposited catalyst component regarding Examples 2-7 and Comparative Examples 1-2 are shown in Table 2. The NOx purification ratios regarding the above catalysts, obtained in the similar manner as that in Example 1, are shown in Tables 3 and 4.

TABLE 1

| | HC (ppm) | CO (ppm) | NOx (ppm) | $O_2$ (vol. %) | $CO_2$ (vol. %) | $SO_2$ (ppm) | L.O. (mL/min) |
|---|---|---|---|---|---|---|---|
| 500° C. | 60 | 180 | 330 | 6.5 | 10.2 | 15 | 8.5 |
| 450° C. | 80 | 130 | 300 | 8.1 | 9.1 | — | 7.0 |
| 400° C. | 100 | 150 | 280 | 9.6 | 8.0 | — | 6.5 |
| 350° C. | 120 | 170 | 240 | 11.0 | 7.0 | — | 5.5 |

L.O. Light oil

TABLE 2

| | | ZSM5 (MFI zeolite) | | | |
|---|---|---|---|---|---|
| | CuO | $SiO_2/Sl_2O_3 = 70$ Average Crystal: less than 0.05 μm | $SiO_2/Sl_2O_3 = 30$ Average Crystal: 0.4 μm | BEA (β zeolite) $SiO_2/Sl_2O_3 = 25$ | Note |
| Example 1 | 7 | | 70 | 25 | |
| Example 2 | 14 | | 140 | 50 | |
| Example 3 | 23 | | 140 | 50 | |
| Example 4 | 7 | 70 | | 25 | |
| Example 5 | 7 | 70 | | 25 | P 0.9 (as oxide) |
| Example 6 | 7 | 70 | | 25 | Ce 5 (as oxide) |
| Example 7 | 7 | 70 | | 25 | B 0.9 (as oxide) |
| Comparative Example 1 | 7 | 95 | | | |
| Comparative Example 2 | 7 | | | 25 | |

In Table 2:
Unit: g/ litter catalyst

TABLE 3

(Fresh)

| | Activity to purification of $NO_x$ (%) | | | |
|---|---|---|---|---|
| | 500° C. | 450° C. | 400° C. | 350° C. |
| Example 1 | 38 | 41 | 39 | 26 |
| Example 2 | 43 | 41 | 42 | 29 |
| Example 3 | 38 | 42 | 44 | 33 |
| Example 4 | 49 | 48 | 48 | 26 |
| Example 5 | 49 | 48 | 48 | 25 |
| Example 6 | 42 | 49 | 48 | 30 |
| Example 7 | 44 | 44 | 44 | 23 |
| Comparative Example 1 | 48 | 49 | 44 | 14 |
| Comparative Example 1 | 30 | 43 | 50 | 27 |

TABLE 4

(Durability)

| | Activity to purification of $NO_x$ (%) | | | |
|---|---|---|---|---|
| | 500° C. | 450° C. | 400° C. | 350° C. |
| Example 1 | 39 | 39 | 39 | 20 |
| Example 2 | 40 | 39 | 42 | 23 |
| Example 3 | 41 | 40 | 42 | 26 |
| Example 4 | 44 | 42 | 40 | 15 |
| Example 5 | 46 | 44 | 42 | 15 |
| Example 6 | 40 | 42 | 44 | 25 |
| Example 7 | 46 | 44 | 40 | 15 |
| Comparative Example 1 | 40 | 40 | 30 | 7 |
| Comparative Example 1 | 33 | 37 | 39 | 14 |

In Tables 3 and 4, Examples 1-7 shows that the NOx purification ratios at low temperatures after the durability test were improved in comparison with the Cu-ZSM5 catalyst of Comparative Example 1. Further, Examples 1-7 shows that the NOx purification ratios at high temperatures were improved at the initial and aged stages in comparison with the Cu-β zeolite catalyst of Comparative Example 2.

When comparing Examples 1 and 4, the catalyst of Example 1 was superior in the NOx purification ratios at the initial and aged stages in the catalyst of Example 1. It is considered that the average particle diameters of the ZSM5 were reduced from 0.4 μm to 0.05 μm, thus gas diffusibility in the catalyst and the NOx purification ability were improved.

Further, Examples 5-7 show that the other components were added in comparison with that catalyst of Example 4. Example 6 shows that the NOx purification ratio at lower temperatures (350° C. and 400° C.) after the durability test was improved, and Examples 5 and 7 show that the HC purification ratios at higher temperatures (450° C. and 500° C.) after the durability test were improved, in comparison with that of Example 4.

INDUSTRIAL APPLICABILITY

The catalyst of the present invention can be utilized for purifying exhaust gases, in particular the exhaust gas from internal combustion engines.

The invention claimed is:

1. A catalyst for purifying exhaust gases, comprising a catalytic component including copper, ZSM-5, and β zeolite; wherein the ZSM-5 has a $SiO_2/Al_2O_3$ molar ratio of (20-100)/1 and an average crystal diameter observed under an electron microscope in a range not exceeding 0.5 μm, the β zeolite has a $SiO_2/Al_2O_3$ molar ratio of (10-50)/1, and the weight ratio of the ZSM-5 and the β zeolite is in the range of 1:0.1-1:5.

2. A catalyst according to claim 1, wherein the copper is deposited on both of the ZSM-5 and the β zeolite.

3. A catalyst according to claim 1, wherein, on a refractory three-dimensional structure, the zeolite is deposited in the range of 70-300 g and the copper is deposited in the state of oxide in the range of 3-30 g per liter of the refractory three-dimensional structure.

4. A catalyst according to claim 1 further comprising at least one element selected from the group consisting of phosphorus, cerium, and boron.

5. A process for purifying an exhaust gas, which comprises treating an exhaust gas from a diesel engine with a catalyst set forth in claim 1.

6. A catalyst according to claim 1, wherein the copper is deposited on both of the ZSM-5 and the β zeolite.

7. A catalyst according to claim 1, wherein the copper is deposited on both of the ZSM-5 and the β zeolite.

8. A catalyst according to claim 1, wherein, on a refractory three-dimensional structure, the zeolite is deposited in the range of 70-300 g and the copper is deposited in the state of oxide in the range of 3-30 g per liter of the refractory three-dimensional structure.

9. A catalyst according to claim 1, wherein, on a refractory three-dimensional structure, the zeolite is deposited in the range of 70-300 g and the copper is deposited in the state of oxide in the range of 3-30 g per liter of the refractory three-dimensional structure.

10. A catalyst according to claim 2, wherein, on a refractory three-dimensional structure, the zeolite is deposited in the range of 70-300 g and the copper is deposited in the state of oxide in the range of 3-30 g per liter of the refractory three-dimensional structure.

11. A catalyst according to claim 1 further comprising at least one element selected from the group consisting of phosphorus, cerium, and boron.

12. A catalyst according to claim 1 further comprising at least one element selected from the group consisting of phosphorus, cerium, and boron.

13. A catalyst according to claim 2 further comprising at least one element selected from the group consisting of phosphorus, cerium, and boron.

14. A catalyst according to claim 3 further comprising at least one element selected from the group consisting of phosphorus, cerium, and boron.

15. A process for purifying an exhaust gas, which comprises treating an exhaust gas from a diesel engine with a catalyst set forth in claim 1.

16. A process for purifying an exhaust gas, which comprises treating an exhaust gas from a diesel engine with a catalyst set forth in claim 1.

17. A process for purifying an exhaust gas, which comprises treating an exhaust gas from a diesel engine with a catalyst set forth in claim 2.

18. A process for purifying an exhaust gas, which comprises treating an exhaust gas from a diesel engine with a catalyst set forth in claim 3.

19. A process for purifying an exhaust gas, which comprises treating an exhaust gas from a diesel engine with a catalyst set forth in claim 4.

* * * * *